Sept. 22, 1959 R. DI PASQUALE ET AL 2,905,738
BATTERY ELECTRODE STRUCTURE
Filed Dec. 14, 1955 2 Sheets-Sheet 1
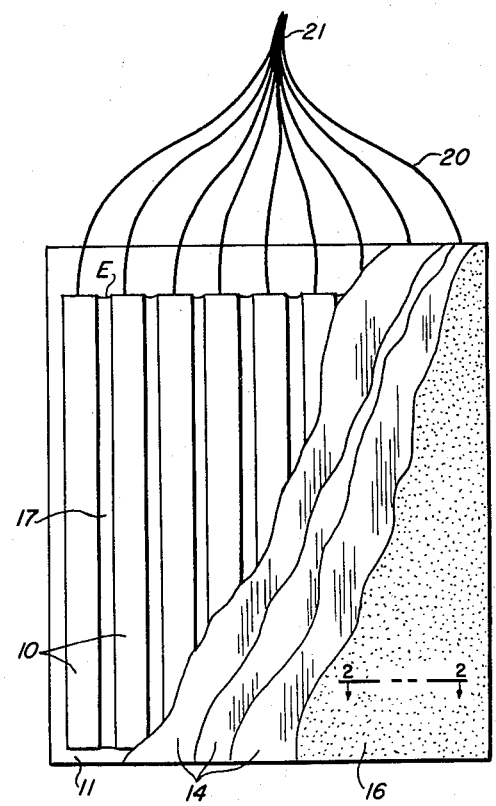
Fig. 1
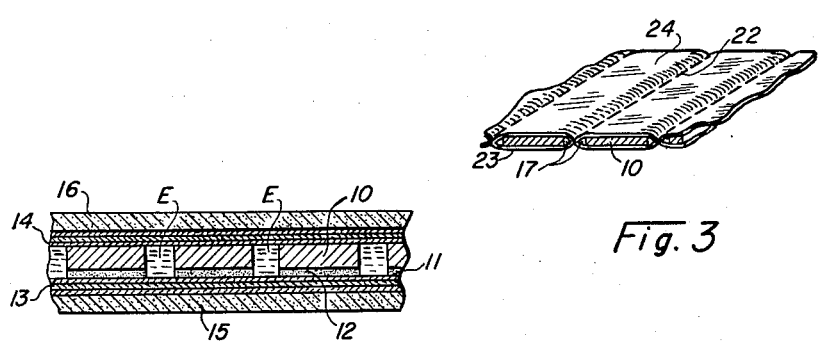
Fig. 2
Fig. 3
INVENTORS:
RENATO DI PASQUALE
CHARLES M. GOLD
BY
J. B. Burke
ATTORNEY INVENTORS:
RENATO DI PASQUALE
CHARLES M. GOLD
BY J. B. Burke
ATTORNEY

United States Patent Office

2,905,738
Patented Sept. 22, 1959

2,905,738

BATTERY ELECTRODE STRUCTURE

Renato Di Pasquale, Jersey City, N.J., and Charles M. Gold, Franklin Square, N.Y., assignors to Yardney International Corp., New York, N.Y., a corporation of New York Application December 14, 1955, Serial No. 553,033

7 Claims. (Cl. 136—6)

This invention relates to the art of electric batteries and particularly concerns a novel electrode structure for use therein.

In electric batteries employing positive and negative electrodes separated by semi-permeable membranes immersed in an electrolyte, the problem of irrigation of the electrodes offers some difficulty. When the electrode is a large metallic plate, dry spots develop during charge or discharge which have the following adverse effects: At dry points solid material crystallizes out of the electrolyte, settles on the electrode and penetrates the separator materials to cause short circuits with adjacent electrodes. Also where dry spots occur the charging or discharging current is reduced so that the entire battery suffers a reduction in electric energy storage and output. The present invention is directed at minimizing or avoiding the foregoing difficulties.

Another important object of the invention is to provide a multi-sectional electrode for a battery for improved irrigation by electrolyte.

It is a further object to provide a multi-sectional electrode for a battery arranged to economize in the use of electrode material as well as to produce maximum irrigation of the electrode.

To realize the above objects, the invention in accordance with one of its aspects provides a multi-sectional electrode including a plurality of electro-chemically active strips connected by fusible elements to a common electrical terminal.

According to another aspect of the invention, we provide a multi-sectional electrode including a co-planar array of flat, spaced-apart electro-chemically active elements.

A further feature of our invention is the provision of a multi-element electrode with novel means for securing the elements thereof in fixed spaced positions to provide irrigation channels for electrolyte.

Still another feature of the invention is the provision of a novel electrode structure having improved means for irrigating the electrode by capillarity.

The invention will be best understood from the following description taken together with the drawing wherein:

Fig. 1 is an elevational view of an electrode assembly embodying the invention;

Fig. 2 is a cross sectional view of a portion of Fig. 1 taken on line 2—2;

Fig. 3 is a fragmentary perspective view showing one way of securing electrode sections in fixed relative positions;

Figure 4:
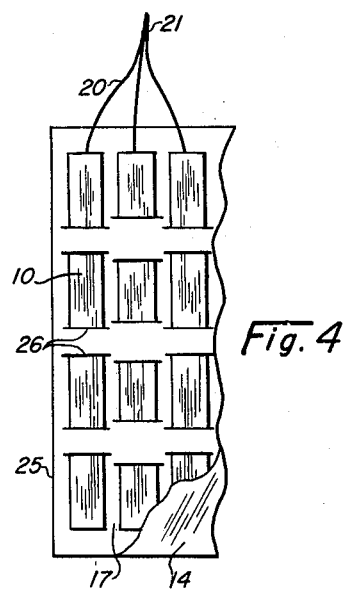
Fig. 4 shows an alternate way of securing electrode sections in fixed positions.

The assembly of Figs. 1 and 2 comprises a plurality of metallic strips 10. These strips are spaced from each other a short distance. The strips may be of silver, zinc, or other metal useful in a battery electrode. The strips are secured to a semi-permeable sheet 11 which may be of cellophane, polyvinyl chloride or the like. One means of securing the strips is shown as the layer of cement 12 in Fig. 2. Disposed adjacent to the sheet 11 are a plurality of electrolyte-permeable sheets 13. A similar group of sheets 14 are disposed on the strips 10. Metallic electrodes 15, 16, which may be more electro-negative or more electro-positive than strips 10, are disposed adjacent sheets 13, 14 respectively. The strips 10 are disposed close to one another but are spaced sufficiently to provide narrow channels 17. These channels are sufficiently narrow so that electrolyte E supplied from a source of free electrolyte not shown may rise by capillarity to fill substantially the entire length of each channel. Attached to each strip 10 is a fine wire conductor 20. These conductors are joined into a common line or cable 21 which may form one terminal of a battery in which the electrode assembly and the electrolyte are disposed.

The wires 20 have such a size that they will carry the full charging current entering and leaving each strip 10, but the wires will burn out if the current becomes excessive therein. If for any reason a short circuit should develop between any strip or strips 10 and electrode 16 causing excessive current in the corresponding wire or wires 20, the affected wire or wires 20 will act as fuses and burn out. The remaining circuits formed by the other strips 10 and electrode 16 will not be affected and the resulting battery output will not be substantially impaired.

In Fig. 3 is shown another means for disposing the strips 10 between the sheets 23, 24 by lines of stitching 22 forming pockets for the strips. These lines of stitching are so arranged that channels 17 are defined on each side of each strip so that the irrigation of the electrode elements by capillarity may occur. The stitching may be done by sewing the sheets 23, 24 together with a suitable thread such as one of nylon. Alternatively, the stitching may be done by electronic heat sealing or welding.

Fig. 4 shows an alternate way of fixing the electrode elements in a sheet 25. The strips 10 are inserted in alternate fashion through slits 26.

Figure 5:
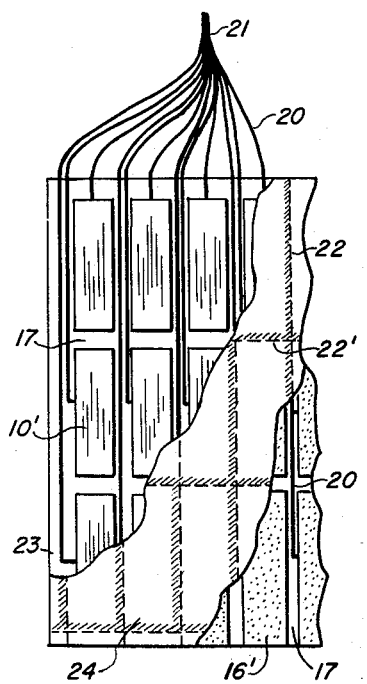
Fig. 5 is an elevational view of a matrix of electrode sections.

In Fig. 5 is shown an electrode in the form of a rectangular matrix of electrode elements 10'. Each element is a short strip of electro-chemically active material such as silver. An individual electric conductor 20 is connected to each electrode element. These conductors are joined together in the common line or cable 21 which may be one terminal lead of a battery. The matrix pattern is maintained by the lines of stitching 22 and 22' in the sheets 23, 24 between which the electrode elements are disposed. Instead of stitching the electrode elements may be cemented to sheet 23 or 25 as shown in Fig. 3.

Figure 6:
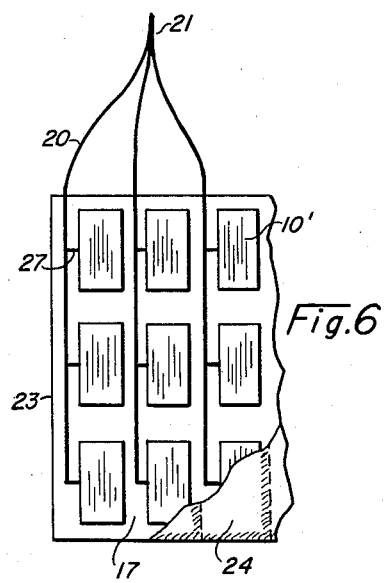

In Fig. 6 is shown an alternate arrangement for the electrical connections to the matrix elements 10'. In this arrangement the elements in each row are connected by short fusible wires 27 in parallel to a single fusible wire 20 which joins with the other wires 20 similarly connected at the common cable 21.

Figure 7:
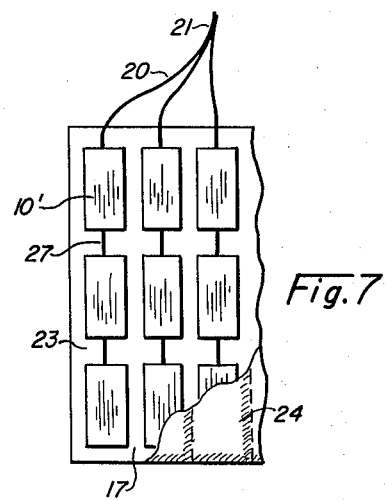
Figs. 6 and 7 show a modified electrode assembly.

In Fig. 7 is shown still another wire arrangement for the matrix elements 10'. The elements in each row are joined together by short fusible wires 27 and the fusible wire 20 is connected to the first element 10' in the row. One wire 20 is provided for each row of electrode elements and all wires 20 are joined in the common line 21.

It will be noted that the close spacing of the electrode elements in the matrix provides channels 17 for irrigation by capillarity of the electrode elements by the electrolyte. The spaces between the electrode elements are shown considerably widened in the drawing for clarity.

Wires 20 should be coated or covered with suitable insulation material to avoid electrical contact with each other. At the common line or cable 21 where the wires 20 are connected in parallel, the wires will be stripped of the insulation so that good electrical contact is made. It will be seen that, in all embodiments disclosed, the wires 20 represent the sole conductive or ohmic link between the flat, co-planar electrode elements 10 or 10'.

The multi-element structure of the electrode insures that a short circuit or deactivation of one element does not materially affect the operation of the remainder of the electrode. Also this structure is particularly adapted to provide maximum possible irrigation by electrolyte, and at the same time an economy in use by expensive electrode metal of as much as 20% is obtained, without loss of electric energy storage capacity or output.

What is claimed is:

1. A battery electrode comprising a non-conductive support, a plurality of elements of electrochemically active material mounted on said support in spaced-apart relationship, said elements having substantially parallel edges which form electrolyte channels separating adjacent elements, and wire means conductively interconnecting said elements, said wire means being fusible by a short-circuit current capable of being delivered by any one of said elements.

2. A battery electrode comprising a plurality of flat elements of electrochemically active material, non-conductive supporting means maintaining said elements spaced apart from one another in a co-planar array, and a plurality of individual conductors respectively extending from said elements to a common junction, said conductors constituting the sole ohmic connection between said elements, and being each fusible by a short-circuit current capable of being delivered by the element respectively connected thereto.

3. A battery electrode according to claim 2, wherein said elements are positioned close enough to one another to form capillary electrolyte channels therebetween.

4. In an electrochemical battery, in combination, at least one first electrode of one polarity, at least one second electrode of opposite polarity, and electrolyte-permeable separator means between said electrodes, said first electrode comprising a plurality of spaced-apart elements of electrochemically active material and individual conductors respectively extending from said elements to a common junction, said conductors constituting the sole ohmic connection between said elements and being each fusible by a short-circuit current passing between the respective element and said second electrode upon failure of said separator means.

5. The combination according to claim 4, further including a liquid electrolyte, said elements being close enough together to form capillary channels for said electrolyte therebetween.

6. The combination according to claim 5, wherein said elements are flat and substantially rectangular and are disposed in a co-planar array, said channels being formed by vertical edges of said elements.

7. In an electrochemical-battery cell, in combination, at least one first electrode of one polarity, at least one second electrode of opposite polarity, a pair of terminals respectively connected to said electrodes, and electrolyte-permeable separator means between said electrodes, at least one of said electrodes comprising electrochemically active material and conductor means extending from said active material to the respective terminal, said conductor means constituting the sole ohmic connection between said active material and said terminal and being fusible by a short-circuit current passing between said electrodes upon failure of said separator means.

References Cited in the file of this patent

UNITED STATES PATENTS

| 274,905 | Brush | Apr. 3, 1883 |
| 1,843,531 | Wilderman | Feb. 2, 1932 |
| 2,075,492 | Zimmerman | Mar. 30, 1937 |
| 2,515,204 | Evans | July 18, 1950 |
| 2,626,294 | Brennan | Jan. 20, 1953 |
| 2,636,916 | Licharz | Apr. 28, 1953 |
| 2,701,271 | Mautner et al. | Feb. 1, 1955 |
| 2,704,781 | Mautner et al. | Mar. 22, 1955 |